United States Patent

D'Auguste et al.

Patent Number: 5,094,861
Date of Patent: Mar. 10, 1992

[54] FLAVORED DRINK STRAW

[76] Inventors: Susanne D'Auguste; Frank D'Auguste, both of 122 Community Cir., Old Bridge, N.J. 08857

[21] Appl. No.: 597,558

[22] Filed: Oct. 15, 1990

[51] Int. Cl.$^5$ ............................................. A23L 2/00
[52] U.S. Cl. ............................................. 426/85; 426/112; 426/115
[58] Field of Search ................ 426/85, 86, 112, 115; 239/33, 310, 315, 316

[56] References Cited

U.S. PATENT DOCUMENTS

| | | | |
|---|---|---|---|
| 885,902 | 4/1908 | Wooding | 239/316 |
| 1,163,635 | 12/1915 | Baldwin | 239/315 |
| 1,254,115 | 1/1918 | Brand | 426/85 |
| 1,996,203 | 4/1935 | Hollingsworth | 426/85 |
| 2,102,920 | 12/1937 | Savage | 426/85 |
| 2,128,448 | 8/1938 | LaMoine et al. | 426/85 |
| 2,659,627 | 11/1953 | McConnell | 239/316 |
| 2,690,930 | 10/1954 | Corson | 239/316 |
| 2,753,267 | 7/1956 | Rabin et al. | 426/85 |
| 2,812,257 | 11/1957 | Scisorek | 426/85 |
| 2,814,528 | 11/1957 | Blascryk | 239/315 |
| 2,846,313 | 8/1958 | Menkin et al. | 426/85 |
| 2,867,536 | 1/1959 | Mead et al. | 426/85 |
| 2,901,357 | 8/1959 | Epstein | 426/85 |
| 2,983,616 | 5/1961 | Levi | 426/85 |
| 3,191,868 | 6/1965 | Brown et al. | 239/310 |
| 3,343,918 | 9/1967 | Moulder | 239/310 |
| 3,370,571 | 2/1968 | Knapp | 239/310 |
| 3,463,361 | 8/1969 | Cook et al. | 426/85 |
| 3,615,595 | 10/1971 | Guttag | 426/85 |
| 3,615,671 | 10/1971 | Groesbeck et al. | 426/85 |
| 3,620,770 | 11/1971 | Harvey | 426/85 |
| 3,717,476 | 2/1973 | Harvey | 426/85 |
| 3,824,322 | 7/1974 | Fiorella | 426/85 |
| 3,933,169 | 1/1976 | Halley | 239/310 |
| 4,816,268 | 3/1989 | Tsau | 426/85 |
| 4,921,713 | 5/1990 | Fowler | 426/96 |

FOREIGN PATENT DOCUMENTS

| | | | |
|---|---|---|---|
| 1143410 | 5/1960 | Fed. Rep. of Germany | 426/85 |
| 2635417 | 2/1978 | Fed. Rep. of Germany | 426/85 |
| 3245711 | 6/1984 | Fed. Rep. of Germany | 426/85 |
| 2158298 | 6/1973 | France | 426/134 |
| 600065 | 11/1959 | Italy | 239/33 |
| 61364 | 8/1939 | Norway | 239/33 |

*Primary Examiner*—Steven Weinstein
*Attorney, Agent, or Firm*—Leon Gilden

[57] ABSTRACT

A drinking straw arrangement including a drinking tube containing a powdered flavoring laminated to an interior surface of the drinking tube for dissolving upon contact with a fluid directed through the tube, with end caps removably mounted relative to the tube for preserving freshness of the flavoring therewithin. A modification of the invention includes spaced inserts, wherein the inserts define metering chambers therebetween as the inserts maintain fluid about the inserts for enhancing dissolving of flavoring contained within the inserts. The inserts are formed of a honeycomb structure defined by conduits surrounded by columns of powdered flavoring, such as chocolate. Alternative inserts may be utilized into woven strands of flavoring to enhance surface area contact of the flavoring with a fluid directed therethrough.

2 Claims, 2 Drawing Sheets

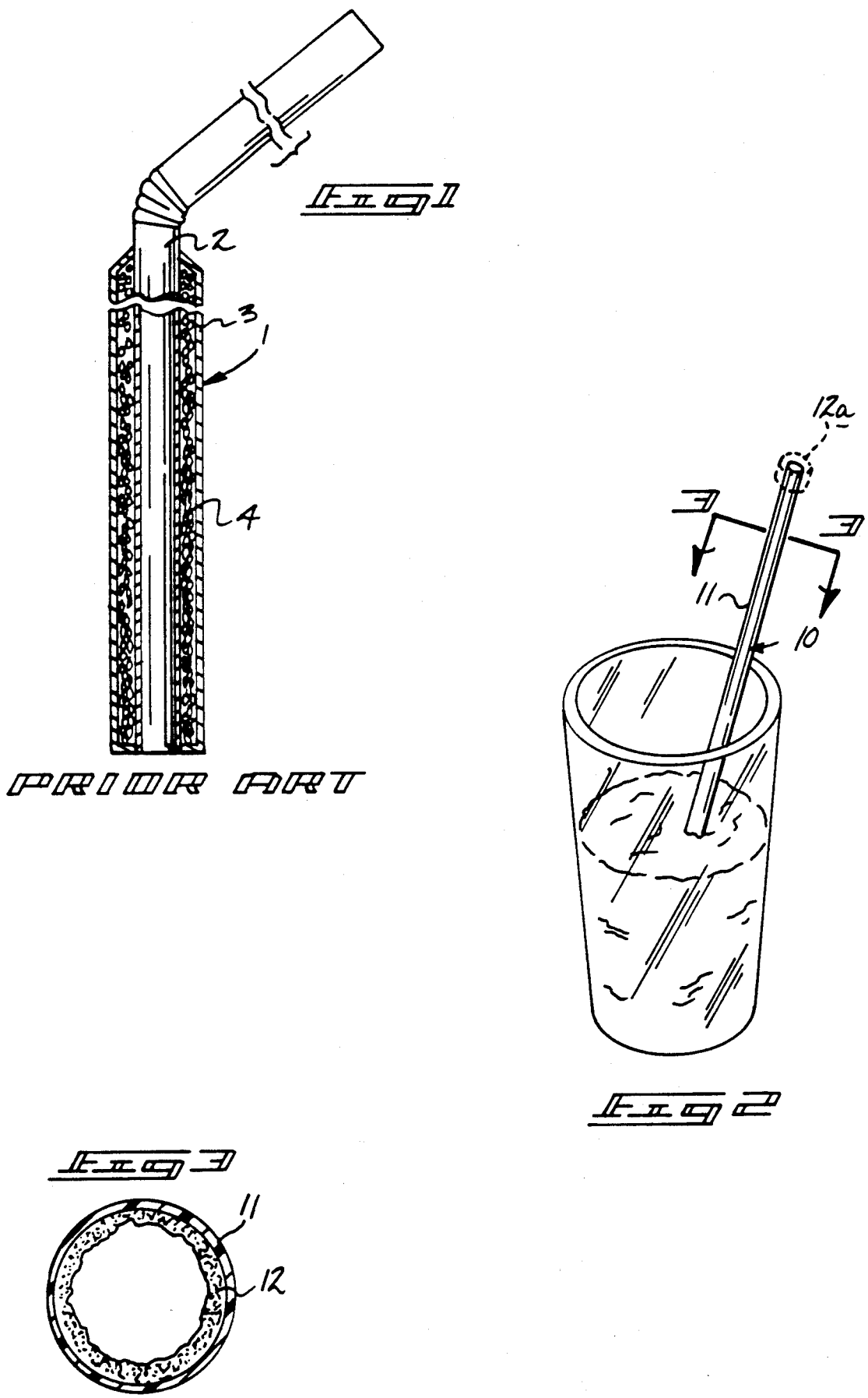

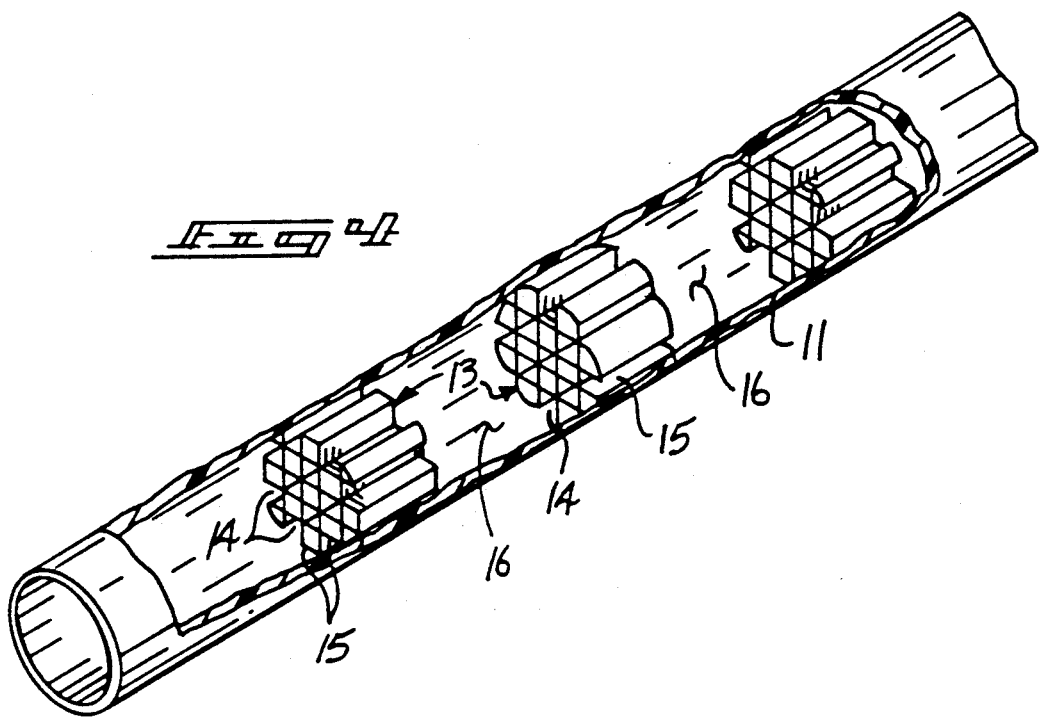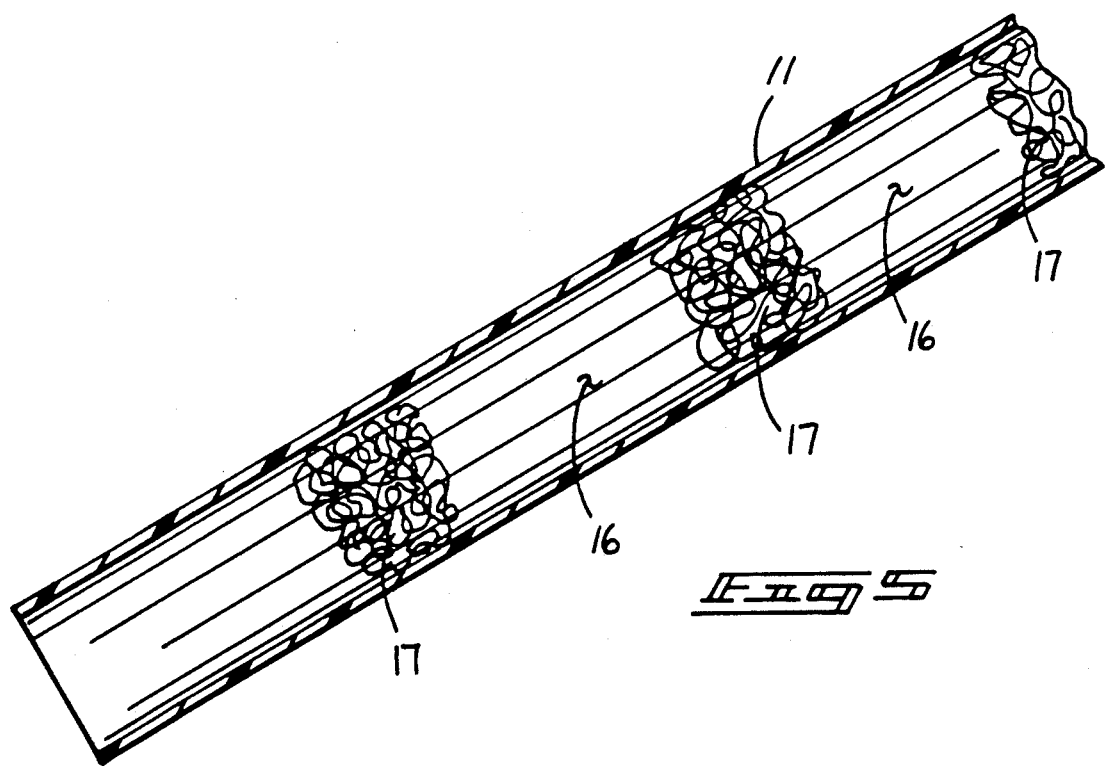

1

FLAVORED DRINK STRAW

BACKGROUND OF THE INVENTION

1. Field of the Invention

The field of invention relates to drinking straws, and more particularly pertains to a new and improved flavored drinking straw wherein the same utilizes self-contained flavoring within the straw structure to impart flavoring to an associated fluid.

2. Description of the Prior Art

Various flavored straw structure has been provided in the prior art to enhance consumption of fluid such as milk by individuals, particularly children. Such straw structure has typically utilized various manners of securing flavoring within the straw structure. Examples of such structure may be found in U.S. Pat. No. 3,615,595 to Guttag wherein the drinking straw utilizes an inner and outer straw layer capturing a flavoring therebetween to permit directing of the flavoring to a surrounding fluid in use.

U.S. Pat. No. 3,957,202 to Hornsby, Jr. sets forth a drinking straw arrangement wherein a layer of liquid crystalline material is disposed thereon, wherein as liquid is drawn through the straw, such color of said liquid crystalline material changes.

U.S. Pat. No. 4,229,482 to Kreske, Jr. sets forth a lollipop made by directing fluid into a mold and thereafter capping the fluid in a straw-like structure.

U.S. Pat. No. 4,717,016 to Dalgeish sets forth a straw-like member wherein flavoring is captured by the straw components.

U.S. Pat. No. 3,545,980 to Stanger sets forth a drinking straw with a candy-like material fixed to at least one end of the straw in a surrounding relationship.

As such, it may be appreciated that there continues to be a need for a new and improved flavored drinking straw as set forth by the instant invention which addresses both the problems of ease of use as well as effectiveness in construction and in this respect, the present invention substantially fulfills this need.

SUMMARY OF THE INVENTION

In view of the foregoing disadvantages inherent in the known types of drinking straws now present in the prior art, the present invention provides a flavored drinking straw wherein the same utilizes various flavored components that may be spaced apart to effect metering chambers and enhancing the flavoring within a fluid directed through the straw. As such, the general purpose of the present invention, which will be described subsequently in greater detail, is to provide a new and improved flavored drinking straw which has all the advantages of the prior art flavored drinking straws and none of the disadvantages.

To attain this, the present invention provides a drinking straw arrangement including a drinking tube containing a powdered flavoring laminated to an interior surface of the drinking tube for dissolving upon contact with a fluid directed through the tube, with end caps removably mounted relative to the tube for preserving freshness of the flavoring therewithin. A modification of the invention includes spaced inserts, wherein the inserts define metering chambers therebetween as the inserts maintain fluid about the inserts for enhancing dissolving of flavoring contained within the inserts. The inserts are formed of a honeycomb structure defined by conduits surrounded by columns of powdered flavoring, such as chocolate. Alternative inserts may be utilized into woven strands of flavoring to enhance surface area contact of the flavoring with a fluid directed therethrough.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved flavored drinking straw which has all the advantages of the prior art flavored drinking straws and none of the disadvantages.

It is another object of the present invention to provide a new and improved flavored drinking straw which may be easily and efficiently manufactured and marketed.

It is a further object of the present invention to provide a new and improved flavored drinking straw which is of a durable and reliable construction.

An even further object of the present invention is to provide a new and improved flavored drinking straw which is susceptible of a low cost of manufacture with regard to both materials and labor, and which accordingly is then susceptible of low prices of sale to the consuming public, thereby making such flavored drinking straws economically available to the buying public.

Still yet another object of the present invention is to provide a new and improved flavored drinking straw which provides in the apparatuses and methods of the prior art some of the advantages thereof, while simultaneously overcoming some of the disadvantages normally associated therewith.

Still another object of the present invention is to provide a new and improved flavored drinking straw wherein the same permits metering of flavoring directed by inserts contained within the straw structure.

These together with other objects of the invention, along with the various features of novelty which characterize the invention, are pointed out with particularity in the claims annexed to and forming a part of this disclosure. For a better understanding of the invention, its operating advantages and the specific objects attained by tis uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is an orthographic view, partially in cross-section, of a prior art drinking straw, as exemplified in U.S. pat. No. 3,615,595.

FIG. 2 is an isometric illustration of the instant invention mounted within a drinking glass.

FIG. 3 is an orthographic view, taken along the lines 3—3 of FIG. 2, in the direction indicated by the arrows.

FIG. 4 is an isometric illustration, partially in section, of a modified drinking straw utilized by the instant invention.

FIG. 5 is an orthographic cross-sectional illustration of a further modified drinking straw utilized by the instant invention.

DESCRIPTION OF THE PREFERRED EMBODIMENT

With reference now to the drawings, and in particular to FIGS. 1 to 5 thereof, a new and improved flavored drinking straw embodying the principles and concepts of the present invention and generally designated by the reference numeral 10 will be described.

FIG. 1 illustrates a prior art drinking straw arrangement, as set forth in U.S. Pat. No. 3,615,595 depicted by numeral 1, wherein an inner tube 2 is formed coaxially of an outer tube 4 containing a flavoring therebetween that is dispersed into a surrounding fluid during use.

More specifically, the flavored drinking straw 10 of the instant invention essentially comprises a drinking tube 11 formed of an impermeable flexible material that is formed with a powdered flavor layer 12 coextensively laminated to an interior surface of the drinking tube 11, with end caps 12a, as illustrated in FIG. 2 for example, securable to each end of the drinking tube and mounted to the drinking tube prior to use to maintain freshness of the contents therewithin.

FIG. 4 illustrates a modification of the invention, wherein the drinking tube 11 includes spaced inserts 13 of a generally elongate honeycomb structure. The honeycomb structure is formed of open conduits 14 alternating or surrounded by adjacent powdered chocolate columns 15 to effect exposure of a greater surface area of chocolate or other suitable flavoring to a fluid directed therethrough. Defined between the spaced inserts 13 are metering chambers 16 to maintain fluid between the inserts 13 and enhance absorption of the flavoring, such as chocolate within the columns 15, into a fluid directed and passing through the tube. FIG. 5 illustrates the use of the metering chambers defined between inserts formed of interwoven strands such as chocolate strands 17 to provide a greater exposure of chocolate or flavoring to a fluid and thereby provide enhanced speed of flavoring of a fluid directed through the drinking tube 11.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by letters patent of the United States is as follows:

1. A flavored drinking straw comprising,
   an elongate drinking tube formed of
   a fluid impermeable material, and
   the drinking tube including an exterior surface and an interior surface, the interior surface including flavoring means mounted therewithin for effecting flavoring of fluid directed through the tube, and
   a cap member removably mounted to each end of the tube for preserving freshness of the flavoring means within the tube, and
   wherein the flavoring means includes a plurality of spaced inserts mounted within the tube with each insert longitudinally spaced from each adjacent insert, and the inserts defining empty metering chambers between adjacent spaced inserts sufficient to maintain fluid between the inserts and enhance absorption of flavoring contained within the inserts about the inserts, wherein each insert includes a plurality of flavoring members therewithin, and wherein the flavoring members are dissolved within a fluid arrested within the metering chambers, and
   wherein each insert includes a honeycomb structure defined by aligned parallel conduits with a conduit of the plurality of conduits surrounded by columns of flavoring material, and
   wherein the flavoring material is chocolate.

2. A flavored drinking straw comprising,
   an elongate drinking tube formed of a fluid impermeable material, and
   the drinking tube including an exterior surface and an interior surface, the interior surface including flavoring means mounted therewithin for effecting flavoring of fluid directed through the tube, and
   a cap member removably mounted to each end of the tube for preserving freshness of the flavoring means with the tube, and
   wherein the flavoring means includes a plurality of spaced inserts mounted within the tube with each insert longitudinally spaced from each adjacent insert, and the inserts defining empty metering chambers between adjacent spaced inserts sufficient to maintain fluid between the inserts and enhance absorption of flavoring contained within the inserts about the inserts, wherein each insert includes a plurality of flavoring members therewithin, and wherein the flavoring members are dissolved within a fluid arrested within the metering chambers, and wherein each insert comprises an interwoven matrix of strand members, each strand member is formed of a flavored material, and wherein the flavoring material is chocolate.

* * * * *